(12) United States Patent
Wang et al.

(10) Patent No.: US 8,359,421 B2
(45) Date of Patent: Jan. 22, 2013

(54) PARTITIONING A CROSSBAR INTERCONNECT IN A MULTI-CHANNEL MEMORY SYSTEM

(75) Inventors: Feng Wang, San Diego, CA (US); Matthew Michael Nowak, San Diego, CA (US); Jonghae Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 12/536,991

(22) Filed: Aug. 6, 2009

(65) Prior Publication Data

US 2011/0035529 A1  Feb. 10, 2011

(51) Int. Cl.
G06F 13/00 (2006.01)
G06F 12/00 (2006.01)
G06F 15/16 (2006.01)

(52) U.S. Cl. .................... 710/317; 709/235; 710/240

(58) Field of Classification Search .................. 710/317, 710/240; 709/235
See application file for complete search history.

(56) References Cited

U.S. PATENT DOCUMENTS

| | | | | |
|---|---|---|---|---|
| 5,530,814 | A * | 6/1996 | Wong et al. ................... | 710/317 |
| 6,058,118 | A | 5/2000 | Rault et al. | |
| 6,065,092 | A | 5/2000 | Roy | |
| 6,076,139 | A | 6/2000 | Welker et al. | |
| 6,230,229 | B1 * | 5/2001 | Van Krevelen et al. ........ | 710/317 |
| 6,381,664 | B1 * | 4/2002 | Nishtala et al. ................ | 710/305 |
| 6,643,746 | B1 | 11/2003 | Bouquet | |
| 6,680,933 | B1 * | 1/2004 | Cheesman et al. ............ | 370/352 |
| 6,715,023 | B1 * | 3/2004 | Abu-Lebdeh et al. ......... | 710/317 |
| 6,836,815 | B1 * | 12/2004 | Purcell et al. ................. | 710/317 |
| 6,915,370 | B2 * | 7/2005 | Rankin et al. ................. | 710/305 |
| 7,016,365 | B1 * | 3/2006 | Grow et al. ................... | 370/413 |
| 7,062,674 | B2 * | 6/2006 | Takamoto ........................ | 714/13 |
| 7,508,756 | B2 * | 3/2009 | King et al. ................... | 370/229 |
| 7,565,475 | B2 * | 7/2009 | Purcell et al. ................. | 710/317 |
| 7,568,063 | B2 * | 7/2009 | Gostin et al. ................. | 710/317 |
| 7,577,727 | B2 * | 8/2009 | Kota et al. .................... | 709/221 |
| 7,587,521 | B2 * | 9/2009 | Akiyama et al. ................. | 710/5 |
| 7,644,221 | B1 * | 1/2010 | Chan et al. ................... | 710/315 |
| 7,707,266 | B2 * | 4/2010 | Lakshmanamurthy et al. .............................. | 709/217 |
| 7,768,519 | B1 * | 8/2010 | Anderson et al. ............. | 345/505 |
| 7,814,252 | B2 * | 10/2010 | Hoshaku ....................... | 710/240 |
| 7,908,422 | B2 * | 3/2011 | Gostin et al. ................. | 710/317 |

(Continued)

OTHER PUBLICATIONS

Anwen Huang et al , Optimization Techniques of On-chip Memory System Based on UltraSPARC Architecture, Apr. 2009.*

(Continued)

*Primary Examiner* — Paul R Myers
*Assistant Examiner* — Christopher a Daley
(74) *Attorney, Agent, or Firm* — Sam Talpalatsky; Nicholas J. Pauley; Jonathan T. Velasco

(57) ABSTRACT

A method includes identifying a first set of masters and a second set of masters from a plurality of masters. The plurality of masters have access to a multi-channel memory via a crossbar interconnect. The method includes partitioning the crossbar interconnect into a plurality of partitions comprising at least a first partition corresponding to the first set of masters and a second partition corresponding to the second set of masters. The method also includes allocating a first set of buffer areas within the multi-channel memory. The first set of buffer areas correspond to the first set of masters. The method further includes allocating a second set of buffer areas within the multi-channel memory. The second set of buffers correspond to the second set of masters.

44 Claims, 8 Drawing Sheets

U.S. PATENT DOCUMENTS

| | | | |
|---|---|---|---|
| 2002/0032796 A1* | 3/2002 | Van Loo | 709/235 |
| 2003/0217244 A1 | 11/2003 | Kelly | |
| 2003/0235189 A1* | 12/2003 | Mathews et al. | 370/379 |
| 2004/0078532 A1* | 4/2004 | Tremaine | 711/160 |
| 2004/0081184 A1* | 4/2004 | Magill et al. | 370/413 |
| 2005/0028057 A1* | 2/2005 | Briggs et al. | 714/718 |
| 2006/0212642 A1* | 9/2006 | Takahashi et al. | 710/317 |
| 2007/0180198 A1* | 8/2007 | Aoki et al. | 711/141 |
| 2008/0046769 A1* | 2/2008 | Osano et al. | 713/324 |
| 2008/0304767 A1* | 12/2008 | Toyofuku | 382/284 |
| 2008/0320254 A1 | 12/2008 | Wingard | |
| 2008/0320268 A1* | 12/2008 | Wingard et al. | 711/202 |
| 2009/0083515 A1 | 3/2009 | Mitra et al. | |
| 2009/0255713 A1* | 10/2009 | Dangler et al. | 174/250 |
| 2010/0268893 A1* | 10/2010 | Luttrell | 711/137 |

OTHER PUBLICATIONS

International Search Report—PCT/ US2010/044736, International Search Authority—European Patent Office Oct. 22, 2010.

Written Opinion—PCT/ US2010/044736, International Search Authority—European Patent Office Oct. 22, 2010.

\* cited by examiner

PARTITIONING A CROSSBAR INTERCONNECT IN A MULTI-CHANNEL MEMORY SYSTEM

I. FIELD

The present disclosure is generally related to partitioning a crossbar interconnect in a multi-channel memory system.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities. For example, the wireless telephones can include multiple processors that use multiple masters to access multi-channel memory.

In a system with multiple masters, interleaving access to multi-channel memory may increase the bandwidth of memory accesses. However, the routing complexity of an interconnect that enables multiple masters to access the multi-channel memory increases as the number of memory channels increases. For example, in a system with n masters and m memory channels, the number of routes required is n×m. Increased routing complexity may result in longer routes between the masters and the memory, which may result in limiting the speed of the interconnect, increased power consumption, and increased heat generation.

III. SUMMARY

In a system with buffer areas in multi-channel memory that are accessed via a crossbar interconnect by multiple masters, grouping the buffer areas assigned to each master and partitioning the crossbar interconnect based on the grouping of the buffer areas can reduce the complexity of the interconnect.

In a particular embodiment, a method includes identifying a first set of masters and a second set of masters from a plurality of masters. The plurality of masters have access to a multi-channel memory via a crossbar interconnect. The method includes partitioning the crossbar interconnect into a plurality of partitions including at least a first partition corresponding to the first set of masters and a second partition corresponding to the second set of masters. The method also includes allocating a first set of buffer areas within the multi-channel memory. The first set of buffer areas correspond to the first set of masters. The method further includes allocating a second set of buffer areas within the multi-channel memory. The second set of buffers correspond to the second set of masters.

In another particular embodiment, a computer-readable tangible medium stores instructions executable by a computer. The instructions are executable by the computer to allocate a first set of buffer areas from a plurality of buffers of a multi-channel memory. The first set of buffer areas are accessible to a first set of masters via a crossbar fabric. The instructions are further executable by the computer to allocate a second set of buffer areas from the plurality of buffers. The second set of buffer areas are accessible to a second set of masters via the crossbar fabric. The instructions are further executable by the computer to create a first partition of the crossbar fabric based on the first set of buffer areas. The instructions are further executable by the computer to create a second partition of the crossbar fabric based on the second set of buffer areas.

In another particular embodiment, an electronic device includes a multi-channel memory having a first set of buffers and a second set of buffers. The electronic device includes a first set of masters and a second set of masters. The first set of buffers are allocated to the first set of masters and the second set of buffers are allocated to the second set of masters. The electronic device includes a crossbar interconnect to enable the plurality of masters to access a multi-channel memory. The crossbar interconnect is partitioned into a plurality of partitions based on the allocation of the first set of buffers to the first set of masters and based on the allocation of the second set of buffers to the second set of masters.

One particular advantage provided by at least one of the disclosed embodiments is a substantial reduction in routing complexity of a crossbar interconnect. Reducing routing complexity may reduce the load of the interconnect partitions and may reduce power consumption by the crossbar interconnect. Another particular advantage provided by at least one of the disclosed embodiments is a reduction in arbitration delay and reduced congestion at a First In First Out (FIFO) queue of masters and slaves, thereby improving bandwidth. Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
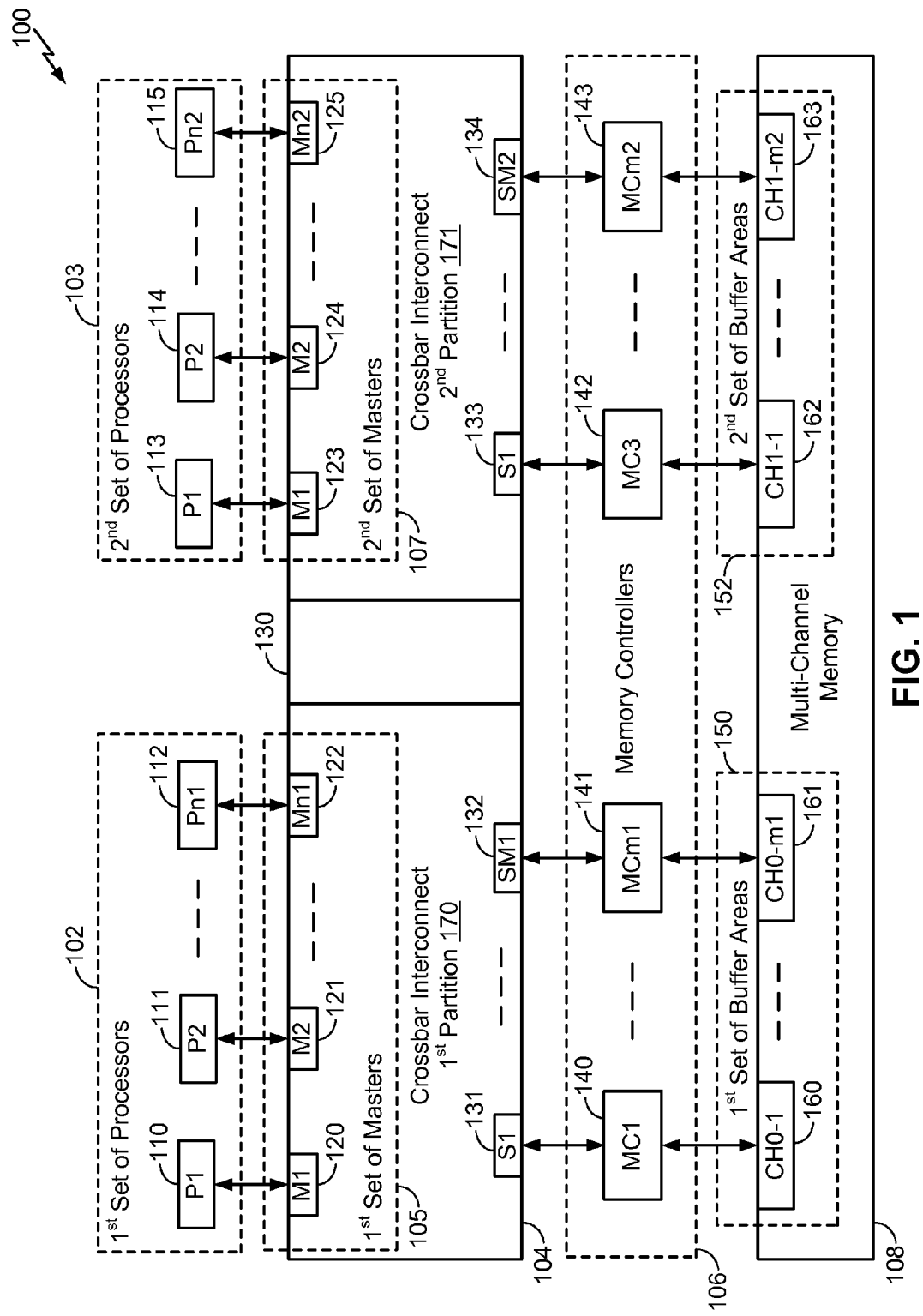
FIG. 1 is a first illustrative embodiment of partitioning a crossbar interconnect in a multi-channel memory system.

Referring to FIG. 1, a first illustrative embodiment of partitioning an interconnect in a multi-channel memory system is depicted and generally designated 100. The system 100 includes a first set of processors 102 and a second set of processors 103 coupled to a crossbar interconnect 104. The crossbar interconnect 104 is coupled to a multi-channel memory 109 via a first set of memory controllers 107 and a second set of memory controllers 108.

The first set of processors 102 includes a first processor 110, a second processor 111, and an n1 processor 112. The second set of processors 103 includes a first processor 113, a second processor 114, and an n2 processor 115. In FIG. 1, n1 represents the total number of processors in the first set of processors 102 and n2 represents the total number of processors in the second set of processors 103. The processors 110-115 may represent various processors that are used to perform specialized functions in an electronic device. For example, the processors 110-115 may include a display control processor, a wireless control processor, a Coder-Decoder (CODEC) processor, Digital Signal Processor (DSP), other type of processor, or any combination thereof. The processors 110-115 may access data stored at the multi-channel memory 109 via the crossbar interconnect 104. For example, the processors 110-115 may read or write to portions of the multi-channel memory 109 via the crossbar interconnect 104.

The first set of memory controllers 107 includes a first memory controller 140 and an m1 memory controller 141. The second set of memory controllers 108 includes a first memory controller 142 and an m2 memory controller 143. The memory controllers 140-143 are adapted to receive requests to access the multi-channel memory 109 from the slaves 131-134. The multi-channel memory 109 may be dual-data rate (DDR) memory. In a particular embodiment, the multi-channel memory 109 may be Through-Silicon Stacking (TSS) stacked DDR memory.

The crossbar interconnect 104 includes a first set of masters 105, a second set of masters 106, a first set of slaves 180, and a second set of slaves 181. The crossbar interconnect 104 may include one or more fabrics, where each fabric enables access to a subset of the multi-channel memory 109. For example, the crossbar interconnect 104 may enable access to several types of multi-channel memory and may therefore have multiple fabrics. The first set of masters 105 includes a first master 120, a second master 121, and an n1 master 122. The second set of masters 106 includes a first master 123, a second master 124, and an n2 master 125. The masters 120-125 may be bus masters that take control of a portion of the crossbar interconnect 104 in order to access the multi-channel memory 109. The masters 120-125 may receive commands to access the multi-channel memory 109 from the processors 110-115. The first set of slaves 180 has m1 number of slaves and includes a first slave 131 and an m1 slave 132. The second set of slaves has m2 number of slaves and includes a first slave 133 and an m2 slave 134. In FIG. 1, (m1+m2) represents the total number of channels of the multi-channel memory 109.

To access the multi-channel memory 109, a particular master of the masters 120-125 may send a memory access request to a particular slave of the slaves 131-134 and the particular slave may access the multi-channel memory 109 via one of the memory controllers 140-143. After accessing the multi-channel memory 109, the particular slave of the slaves 131-134 may send a result of the memory access to the particular master of the masters 120-125. The particular master may send the result of the memory access to the processor that requested the memory access. For example, the processor 110 may send a request to the master 120 to read a particular memory location of the multi-channel memory 109. The master 120 may receive the request from the processor 110 and send a slave request to the slave 131 via the crossbar interconnect 104. The slave 131 may receive the slave request from the master 120 and send a memory access request to the memory controller 140. The memory controller 140 may receive the memory access request, perform the memory access request to the multi-channel memory 109, and return a result of the memory access request to the slave 131. The slave 131 may send the result of the memory access request to the master 120. The master 120 may send the result of the memory access request to the processor 110.

In operation, the masters 120-122 may be identified as the first set of masters 105 and the masters 123-125 may be identified as the second set of masters 106. For example, the masters 120-125 may be grouped into the first set of masters 105 and the second set of masters 106 using design software. A divider 130 may be added to partition the crossbar interconnect 104 into the first partition 170 and the second partition 171. In a particular embodiment, the crossbar interconnect 104 is partitioned into the first partition 170 and the second partition 171 using software at a design stage prior to manufacture. In another particular embodiment, the crossbar interconnect 104 is partitioned into the first partition 170 and the second partition 171 using software after an electronic device that includes the system 100 has been manufactured. A first set of buffer areas 150 may be allocated from the multi-channel memory 109 for use by the first set of masters 105. A second set of buffer areas 152 may be allocated from the multi-channel memory 109 for use by the second set of masters 106. For example, the first set of master 105 may be assigned to use the first set of buffer areas 150 via the first partition 170 and the second set of masters 106 may be assigned to use the second set of buffer areas 152 via the second partition 171.

The first set of buffer areas 150 may be identified for use by the first set of masters 105 before the crossbar interconnect 104 is partitioned. The second set of buffer areas 152 may be identified for use by the second set of masters 106 before the crossbar interconnect 104 is partitioned. For example, the crossbar interconnect 104 may be partitioned based on the particular set of buffer areas allocated for use by the first set of masters 105 and the particular set of buffer areas allocated for use by the second set of masters 106.

The first set of buffer areas 150 and the second set of buffer areas 152 may be allocated via software. In a particular embodiment, the first set of buffer areas 150 and the second set of buffer areas 152 are allocated prior to being manufactured. In another particular embodiment, the first set of buffer areas 150 and the second set of buffer areas 152 are allocated after an electronic device that includes the system 100 is manufactured. The number of buffer areas 160-163 needed for the masters 110-115 may be identified before or after an electronic device that includes the system 100 is manufactured.

By partitioning the crossbar interconnect 104 into the first partition 170 and the second partition 171, the routing complexity of the crossbar interconnect 104 may be reduced. For example, after partitioning the crossbar interconnect 104, the first partition 170 enables the first set of masters 105 to access the first set of buffer areas 150. After partitioning, the crossbar interconnect 104 interconnections between the first set of masters 105 and the second set of buffer areas 152 and between the second set of masters 106 and the first set of buffer areas 150 are no longer present, reducing the complexity of the crossbar interconnect 104. By reducing the complexity of the crossbar interconnect 104, the number of interconnections in the crossbar interconnect 104 may be reduced, thereby reducing power consumption and heat generated by the crossbar interconnect 104. In addition, by partitioning the crossbar interconnect 104 and thereby reducing the complexity of the crossbar interconnect 104, the first set of masters 105 and the second set of masters 106 may be able to access the slaves 131-134 faster because the interconnections of the crossbar interconnect 104 may be shorter. For example, when the crossbar interconnect 104 is not partitioned, interconnections between the first set of masters 105 and the slaves 133-134 may be physically longer than interconnections between the first set of masters 105 and the slaves 131-132. To illustrate, when the crossbar interconnect 104 is partitioned, the longer interconnections between the first set of masters 105 and the slaves 133-134 are no longer present.

Thus, the n masters 120-125 may be divided into the first set of masters 105 having n1 masters, and the second set of masters 106 having n2 masters, where n=n1+n2. The m memory channels 160-163 may be divided into the first set of buffer areas 150 having m1 memory channels, and the second set of buffer areas 152 having m2 memory channels, where m=m1+m2. The crossbar interconnect 104 can be partitioned into the first partition 170, to enable first set of masters 105 to the first set of buffer areas 150, and the second partition, to enable the second set of masters 106 to access the second set of buffer areas 152. Thus, the routing complexity of the crossbar interconnect 104 can be reduced from n×m routes to (n1×m1)+(n2×m2) routes by partitioning. For example, when there are 12 masters and 6 memory channels, the routing complexity is 12×6=72 routes. Partitioning each of the masters 120-125 and the memory channels 160-163 into equal sized groups may result in a total routing complexity of (6×3)+(6×3)=36 routes. More than two partitions can be used to further reduce the routing complexity of a crossbar interconnect 104. For example, when three partitions are created for 12 masters and 6 memory channels, the routing complexity of a crossbar interconnect can be reduced to (4×2)+(4×2)+(4×2)=24 routes. Thus, partitioning the crossbar interconnect 104 can reduce the complexity of the crossbar interconnect 104.

Figure 2:
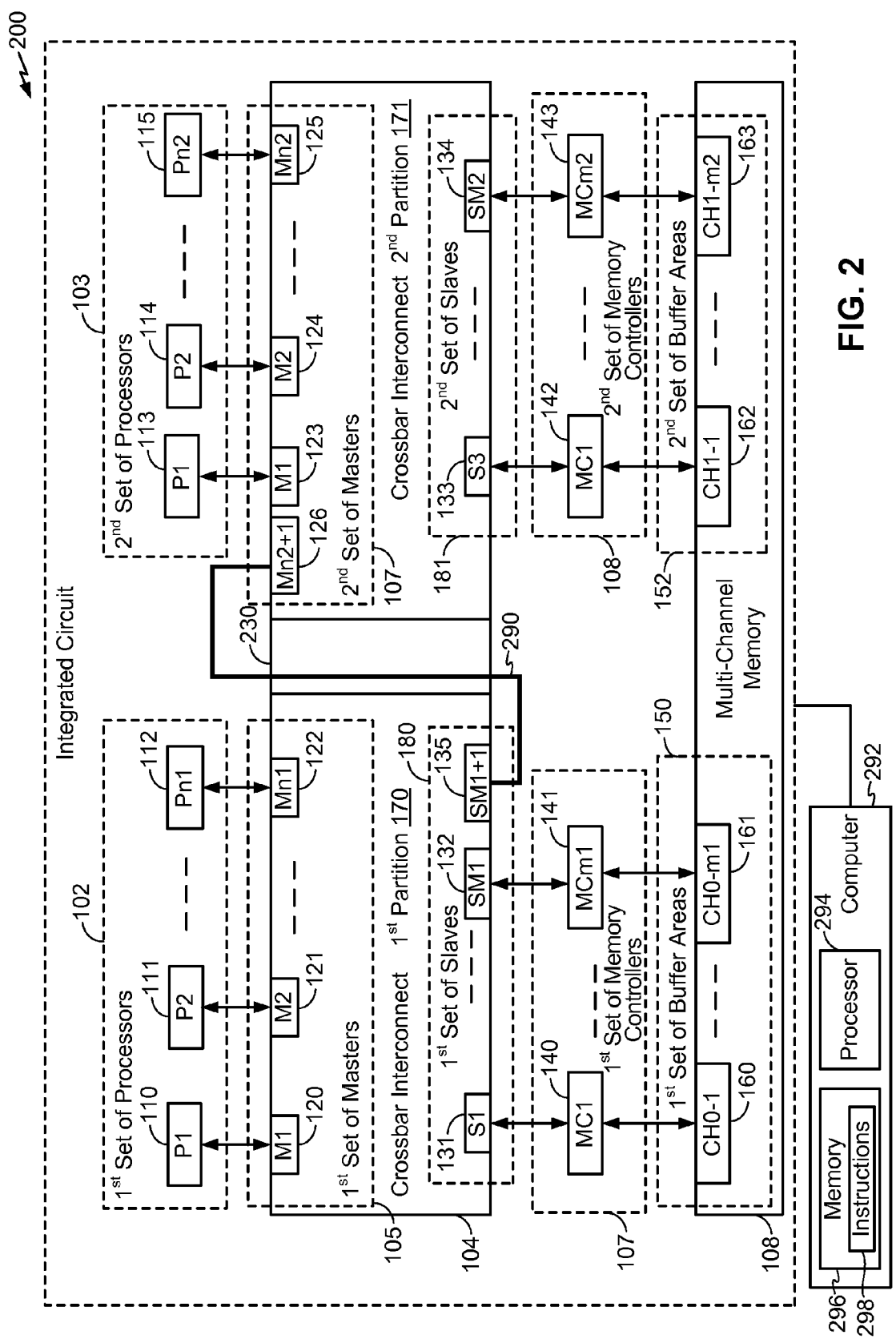
FIG. 2 is a second illustrative embodiment of partitioning a crossbar interconnect in a multi-channel memory system.

Referring to FIG. 2, a second illustrative embodiment of partitioning an interconnect in a multi-channel memory system is depicted and generally designated 200. The system 200 includes an integrated circuit 201 and a computer 292.

The integrated circuit 201 includes the first set of processors 102 and the second set of processors 103 coupled to the crossbar interconnect 104. The crossbar interconnect 104 is coupled to the multi-channel memory 109 via the first set of memory controllers 107 and the second set of memory controllers 108. The function of these elements is substantially similar to the corresponding elements described in FIG. 1. In addition to the elements of FIG. 1, the embodiment illustrated in FIG. 2 has an access path 290 added between an m1+1 slave 135 of the first set of slaves 180 and an n2+1 master 126 of the second set of masters 106 to electrically couple the first partition 170 to the second partition 171. The access path 290 may enable a master from the first set of masters 105 to access one or more of the second set of buffer areas 152. For example, the second set of buffer areas 152 may be less frequently accessed by the first set of masters 105 or the second set of buffer areas 152 may tolerate a larger latency than the first set of buffer areas 150. The resulting routing complexity of partitioning the crossbar interconnect 104 and adding the access path 290 is less than when the crossbar interconnect 104 is not partitioned because one additional route is added. For example, when there are n masters and m memory channels, the routing complexity of the unpartitioned crossbar interconnect 104 is n×m routes. Partitioning the crossbar interconnect 104 as illustrated in FIG. 1 results in a routing complexity of (n1×m1)+(n2×m2) routes. Partitioning the crossbar interconnect 104 and adding the access path 290 as illustrated in FIG. 2 increases the routing complexity to n1×(m1+1))+((n2+1)×m2)+1 routes.

The computer 292 includes a processor 294 and a memory 296. The memory 296 includes instructions 298. The instructions 298 may be executable by the computer 292 to perform various functions. For example, the instructions 298 may include electronic design software instructions that are executable by the computer 292 to design the integrated circuit 201. The instructions 298 may be executable by the computer 292 to enable a user to identify the first set of processors 102 and the second set of processors 103. The instructions 298 may be executable by the computer 292 to allocate the first set of buffer areas 150 for use by the first set of masters 105 and to allocate the second set of buffer areas 152 for use by the second set of masters 106. The instructions 298 may be executable by the computer 292 to partition the crossbar interconnect 104 into the first partition 170 and the second partition 171.

The instructions 298 may be executable by the computer 292 to enable the access path 290 between the first partition 170 and the second partition 171. In a particular embodiment, the instructions 298 may include integrated circuit design software instructions which are executed by the computer 292 to partition the crossbar interconnect 104 and to create the access path 290 before the integrated circuit 201 is manufactured. In another particular embodiment, the instructions 298 may include integrated circuit design software instructions which are executed by the computer 292 to partition the crossbar interconnect 104 and to create the access path 290 after the integrated circuit 201 is manufactured.

In operation, the instructions 298 may be executable by the computer 292 to allocate the first set of buffer areas 150 and enable the first set of masters 105 to access the first set of buffer areas 150. The instructions 298 may be further executable by the computer 292 to allocate the second set of buffer areas 152 for use by the second set of masters 106. For example, the first set of masters 105 may access the first set of buffer areas 150 via the crossbar interconnect 104. The instructions 298 may be further executable by the computer 292 to create the first partition 170 based on the first set of buffer areas 150 and to create the second partition 171 based on the second set of buffer areas 152. The instructions 298 may be further executable by computer 292 to enable an access path 290 from enabling the first set of masters 105 to access the second set of buffer areas.

The first set of buffer areas 150 may be allocated based on the number of slaves associated with the first set of masters 105. For example, the first set of buffer areas 150 may be allocated based on how many of the slaves 131-134 are used by each of the masters 120-122 of the first set of masters 105. The instructions 298 may be further executable by the computer 292 to allocate the first set of buffer areas 150 based on a number of channels of the multi-channel memory 109. For example, when the multi-channel memory 109 is a three-channel memory more buffers may be allocated in the first set of buffer areas 150 than when the multi-channel memory 109 is a two-channel memory.

The first set of buffer areas 150 and the second set of buffer areas 152 may be allocated based on a buffer size of each of the buffer areas 160-163. For example, how many buffer areas are allocated for the first set of buffer areas 150 and the second set of buffer areas 152 may be determined based at least partially on a size of each of the buffer areas 160-163. The first set of buffer areas 150 and the second set of buffer areas 152 may be allocated based on an access speed of the multi-channel memory 109. For example, a faster access speed of the multi-channel memory 109 may require more buffers to be allocated for the first set of buffer areas 150 and the second set of buffer areas 152. The first set of buffer areas 150 may be allocated based on a first distance between the first set of masters 105 and the first set of slaves 180. For example, if the distance between the first set of masters 105 and the first set of slaves 180 is greater than a threshold, additional buffer areas may be allocated for the first set of buffer areas 150 and the second set of buffer areas 152.

Thus, by partitioning the crossbar interconnect 104 into the first partition 170 and the second partition 171, the routing complexity of the crossbar interconnect 104 may be reduced, thereby reducing power consumption and increasing a speed of accessing the multi-channel memory 109. Adding the access path 290 enables the first set of masters 105 to access the second set of buffer areas 152. In this way, the routing complexity of the crossbar interconnect 104 can be reduced by partitioning the crossbar interconnect 104 while providing interconnection flexibility that enables any of the masters 120-122 to access any of the buffer areas 160-163.

Figure 3:
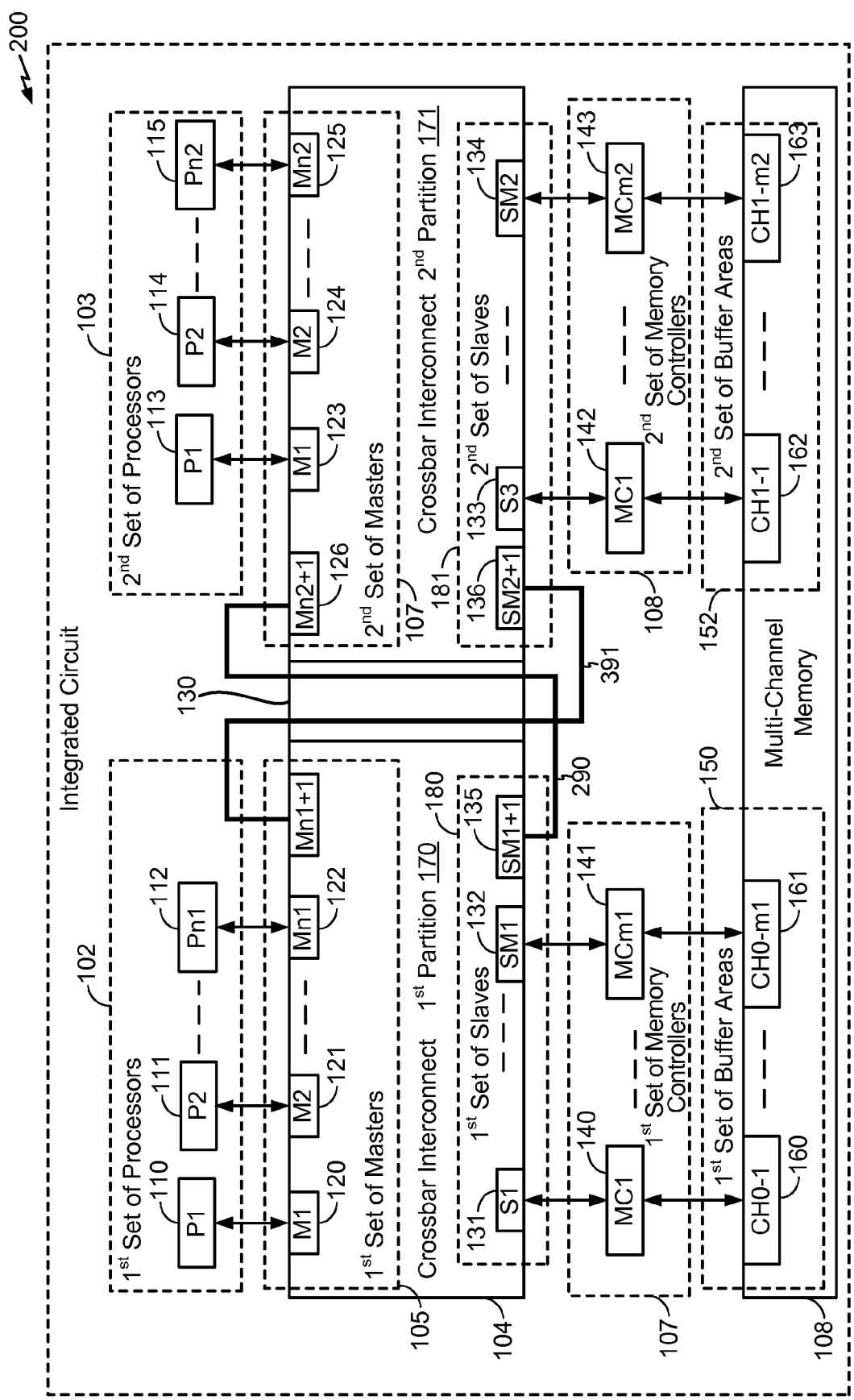
FIG. 3 is a third illustrative embodiment of partitioning a crossbar interconnect in a multi-channel memory system.

Referring to FIG. 3, a third illustrative embodiment of partitioning an interconnect in a multi-channel memory system is depicted and generally designated 300. The system 300 includes a first set of processors 102, a second set of processors 103, a crossbar interconnect 104, a first set of memory controllers 107, a second set of memory controllers 108, and a multi-channel memory 109. The function of these elements is substantially similar to the corresponding elements described in FIG. 2. In addition, the embodiment illustrated in FIG. 3 has an access path 391 added between an n1+1 master 127 of the first set of masters 105 and an m2+1 slave 136 of the second set of slaves 181 to electrically couple the second partition 171 to the first partition 170. The access path 391 may enable a master from the second set of masters 106 to access one or more of the first set of buffer areas 150. For example, the first set of buffer areas 150 may be less frequently accessed by the second set of masters 106 or the first set of buffer areas 150 may tolerate a larger latency than the second set of buffer areas 152. The resulting routing complexity of partitioning the crossbar interconnect 104 and adding the access path 290 is less than when the crossbar interconnect 104 is not partitioned because two additional routes are added. For example, when there are n masters and m memory channels, the routing complexity of the unpartitioned crossbar interconnect 104 is n×m routes. Partitioning the crossbar interconnect 104 as illustrated in FIG. 1 results in a routing complexity of (n1×m1)+(n2×m2) routes, where m=m1+m2 and n=n1+n2. Partitioning the crossbar interconnect 104 and adding the access path 290 as illustrated in FIG. 2 increases the routing complexity to (n1×(m1+1))+((n2+1)×m2) routes. Adding the access path 391 as illustrated in FIG. 3 increases the routing complexity to ((n1+1)×(m1+1))+((n2+1)×(m2+1))+2 routes.

Figure 4:
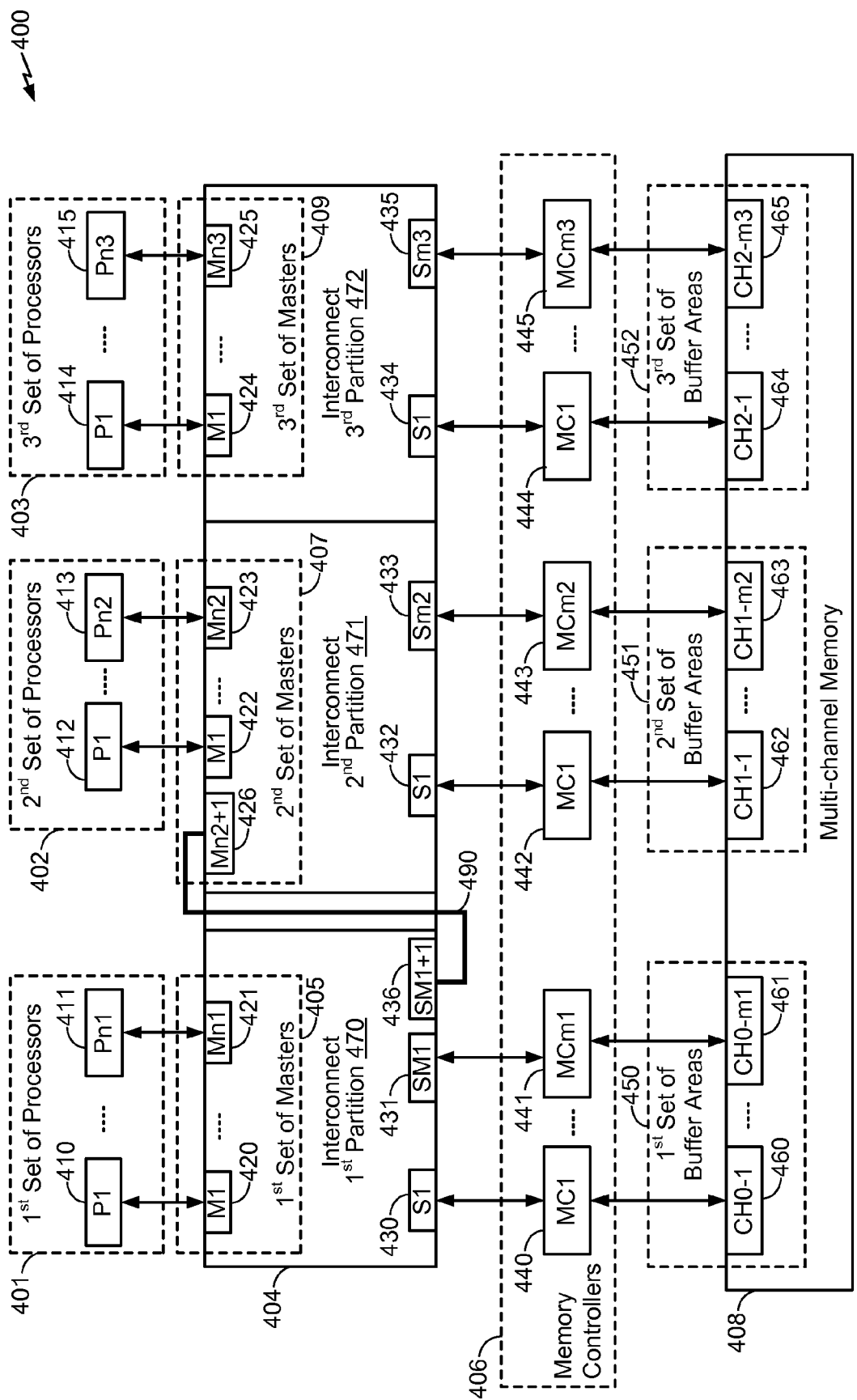
FIG. 4 is a fourth illustrative embodiment of partitioning a crossbar interconnect in a multi-channel memory system.

Referring to FIG. 4, a fourth illustrative embodiment of partitioning an interconnect in a multi-channel memory system is depicted and generally designated 400. The system 400 includes a first set of processors 401, a second set of processors 402, and a third set of processors 403 that access a multi-channel memory 408 via a crossbar interconnect 404 and memory controllers 406.

The first set of processors 401 includes a first processor 410 and an n1 processor 411. The second set of processors 402 includes a first processor 412 and an n2 processor 413. The third set of processors 403 includes a first processor 414 and an n3 processor 415. In FIG. 3, n1 represents the total number of processors in the first set of processors 401, n2 represents the total number of processors in the second set of processors 402, and n3 represents the total number of processors in the third set of processors 403. The processors 410-415 may represent various processors that are used to perform specialized functions in an electronic device. For example, the processors 410-415 may include a display control processor, a wireless control processor, a Coder-Decoder (CODEC) processor, Digital Signal Processor (DSP), other type of processor, or any combination thereof. The processors 410-415 may access data stored at the multi-channel memory 408 via the crossbar interconnect 404. For example, the processors 410-415 may read or write to portions of the multi-channel memory 408 via the crossbar interconnect 404

The crossbar interconnect 404 includes a first set of masters 405, a second set of masters 407, a third set of masters 409, a first slave 430, a second slave 431, a third slave 432, and a fourth slave 433. The crossbar interconnect may include more one or more fabrics, where each fabric enables access to a subset of the multi-channel memory 408. For example, the crossbar interconnect 404 may enable access to several types of multi-channel memory and may therefore have a number of fabrics. The crossbar interconnect may be referred to as a crossbar fabric.

The first set of masters 405 includes a first master 420 and an n1 master 421. The second set of masters 407 includes a first master 422 and an n1 master 423. The third set of masters 409 includes a first master 424 and an n1 master 425. The masters 420-425 may be bus masters that take control of a portion of the crossbar interconnect 404 in order to access the multi-channel memory 408. The masters 420-425 may receive commands to access the multi-channel memory 408 from the processors 410-415. To access the multi-channel memory 408, a particular master of the masters 420-425 may send a memory access request to a particular slave of the slaves 430-435 and the particular slave may access the multi-channel memory 408 via one of the memory controllers 406. After accessing the multi-channel memory 408, the particular slave of the slaves 430-435 may send a result of the memory access to the particular master of the masters 420-425. The particular master may send the result of the memory access to the processor that requested the memory access. For example, the processor 410 may send a request to the master 420 to read a particular memory location of the multi-channel memory 408. The master 420 may receive the request from the processor 410 and send a slave request to the slave 430 via the crossbar interconnect 404. The slave 430 may receive the slave request from the master 420 and send a memory access request to the memory controller 440. The memory controller 440 may receive the memory access request, perform the memory access request to the multi-channel memory 408, and return a result of the memory access request to the slave 430. The slave 430 may send the result of the memory access request to the master 420. The master 420 may send the result of the memory access request to the processor 410.

The memory controllers 406 include a first memory controller 440, a second memory controller 441, a third memory controller 442, a fourth memory controller 443, a fifth memory controller 444, and a sixth memory controller 445. The memory controllers 440-445 may receive requests to access the multi-channel memory 408 from the slaves 430-435. The multi-channel memory 408 may be dual-data rate (DDR) memory.

In FIG. 4, the multi-channel memory 408 has three channels of memory, channel zero, channel one, and channel two. The first set of buffer areas 450 include a first channel zero buffer area 460 and an m1 channel zero buffer area 461. The second set of buffer areas 451 includes a first channel one buffer area 462 and an m2 channel one buffer area 463. The third set of buffer areas 452 include a first channel two buffer area 464 and an m3 channel two buffer area 465.

In operation, the first set of buffer areas 450, the second set of buffer areas 451, and the third set of buffer areas 452 may be allocated in the multi-channel memory 408. The first set of buffer areas 450 may be accessible by the first set of masters 405 via the crossbar interconnect 404. The second set of buffer areas 451 may be accessible by the second set of masters 407 via the crossbar interconnect 404. The third set of buffer areas 452 may be accessible by the third set of masters 409 via the crossbar interconnect 404.

The crossbar interconnect 404 may be partitioned to create a first partition 470, a second partition 471, and a third partition 472. The first partition 470 may be created based on one or more attributes of the first set of buffer areas 450. For example, the first partition 470 may be created based on a size of the first set of buffer areas 450, based on a speed that the first set of buffer areas 450 are capable of being accessed, based on a size of each buffer of the first set of buffer areas 450, other attribute of the first set of buffer areas 450, or any combination thereof. The second partition 471 may be created based on one or more attributes of the second set of buffer areas 451. The third partition 472 may be created based on one or more attributes of the third set of buffer areas 452.

The first set of buffer areas 450 may be identified for use by the first set of masters 405 before the crossbar interconnect 404 is partitioned. The second set of buffer areas 451 may be identified for use by the second set of masters 407 before the crossbar interconnect 404 is partitioned. The third set of buffer areas 452 may be identified for use by the third set of masters 409 before the crossbar interconnect 404 is partitioned. For example, the crossbar interconnect 404 may be partitioned based on the particular set of buffer areas allocated for use by the first set of masters 405, the particular set of buffer areas allocated for use by the second set of masters 407, and the particular set of buffer areas allocated for use by the third set of masters 409.

In a particular embodiment the crossbar interconnect 404 is partitioned into the first partition 470, the second partition 471, and the third partition 472 before the crossbar interconnect 404 is manufactured. For example, the crossbar interconnect 404 may be partitioned at a design stage prior to manufacture.

In another particular embodiment, the crossbar interconnect 404 is partitioned into the first partition 470, the second partition 471, and the third partition 472 after the crossbar interconnect is manufactured. For example, the crossbar interconnect 404 may be partitioned using software commands after the crossbar interconnect 404 is manufactured.

The sets of buffer areas 450-452 may be allocated via software. For example, the sets of buffer areas 450-452 may be allocated using design software when designing an electronic device or integrated circuit that includes the system 400. The design software may identify the amount of buffer areas needed for a particular set of masters prior to manufacture.

By partitioning the crossbar interconnect 404 into the partitions 470, 471, and 472, the routing complexity of the crossbar interconnect 404 may be reduced. By reducing the routing complexity of the crossbar interconnect 404, the heat consumption and power requirements of the crossbar interconnect 404 may be reduced.

Figure 5:
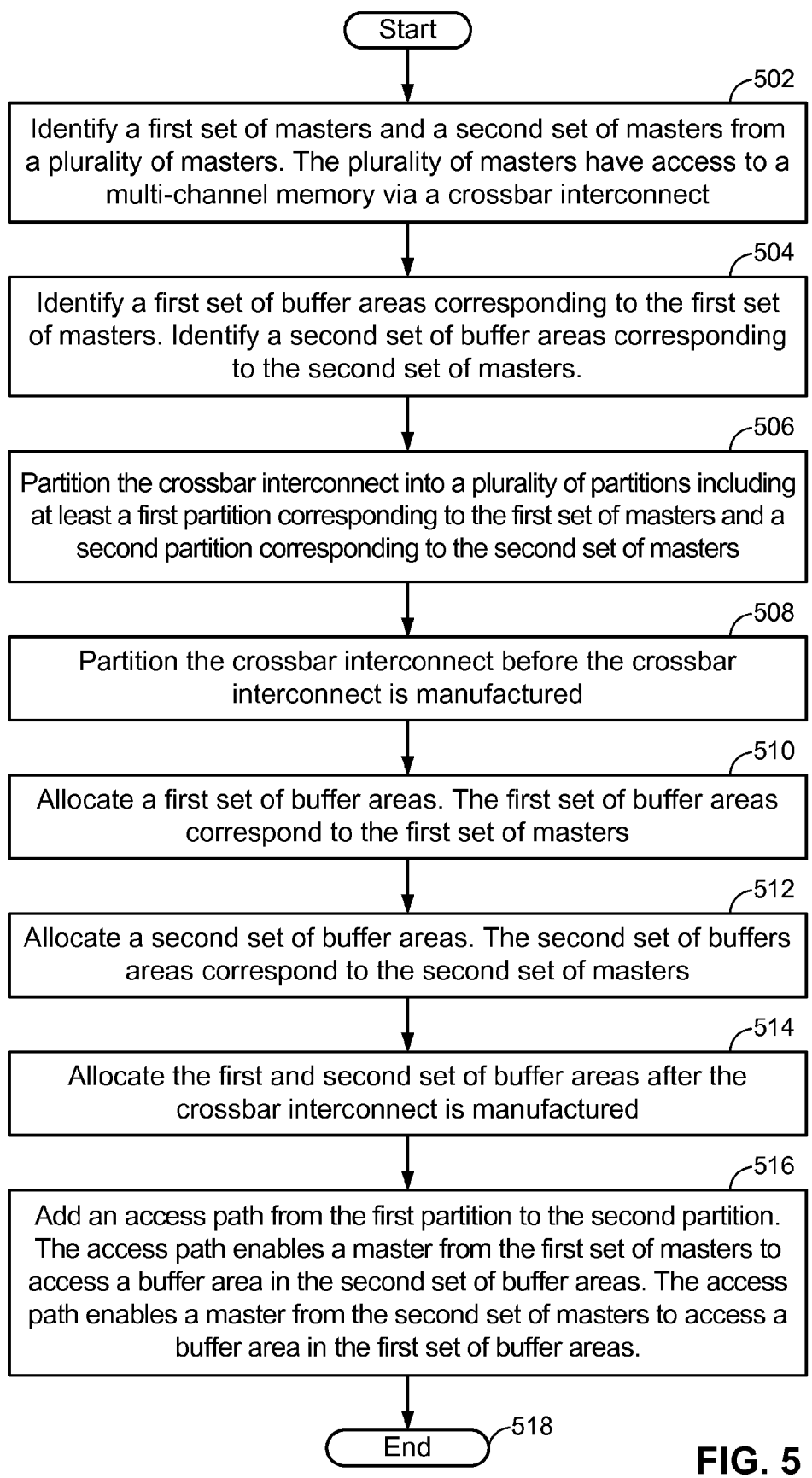
FIG. 5 is a flow diagram of a first illustrative embodiment of a method of partitioning an interconnect in a multi-channel memory system.

FIG. 5 is flow diagram of a first illustrative embodiment of partitioning a crossbar interconnect in a multi-channel memory system. The method may be performed by a computer, such as the computer 292 in FIG. 2.

A first set of masters and a second set of masters are identified from a plurality of masters, at 502. The plurality of masters have access to a multi-channel memory via a crossbar interconnect. Moving to 504, a first set of buffer areas corresponding to the first set of masters and a second set of buffer areas corresponding to second set of masters are identified. Advancing to 506, the crossbar interconnect is partitioned into a plurality of partitions including at least a first partition corresponding to the first set of masters and a second partition corresponding to a second set of masters. Proceeding to 508, an access path may be added from the first partition to the second partition. For example, in FIG. 2, the access path 290 may be added between the first partition 170 and the second partition 171. The access path may enable a master from the first set of masters to access a buffer area in the second set of buffer areas. More than one access path may be added. For example, in FIG. 3, the access path 290 enables the first set of masters 105 to access the second set of buffer areas 152 and the access path 391 enables the second set of masters 106 to access the first set of buffer areas 150. Proceeding to 510, the crossbar interconnect may be partitioned before the crossbar interconnect is manufactured.

Continuing to 512, a first set of buffer areas is allocated. The first set of buffer areas correspond to the first set of masters. For example, in FIG. 1, the first set of buffer areas 150 may be accessible by the first set of masters 105. Advancing to 514, a second set of buffer areas is allocated. The second set of buffer areas correspond to the second set of masters. For example, in FIG. 1, the second set of buffer areas 152 may be accessible by the second set of masters 106. Moving to 516, the first and second set of buffer areas may be allocated after the crossbar interconnect is manufactured. For example, in FIG. 1, the crossbar interconnect 104 may be partitioned during design and the first and second set of buffer areas 150 and 152 may be allocated after the crossbar interconnect 104 is manufactured. The method ends at 518.

Thus, by partitioning a crossbar interconnect into at least a first partition and a second partition, a routing complexity of the crossbar interconnect may be reduced, thereby reducing power consumption and increasing a speed of memory accesses. Adding an access path enables a master from a first set of masters to access a second set of buffer areas. Adding an access path does not significantly increase routing complexity because adding the access path only adds one additional route.

Figure 6:
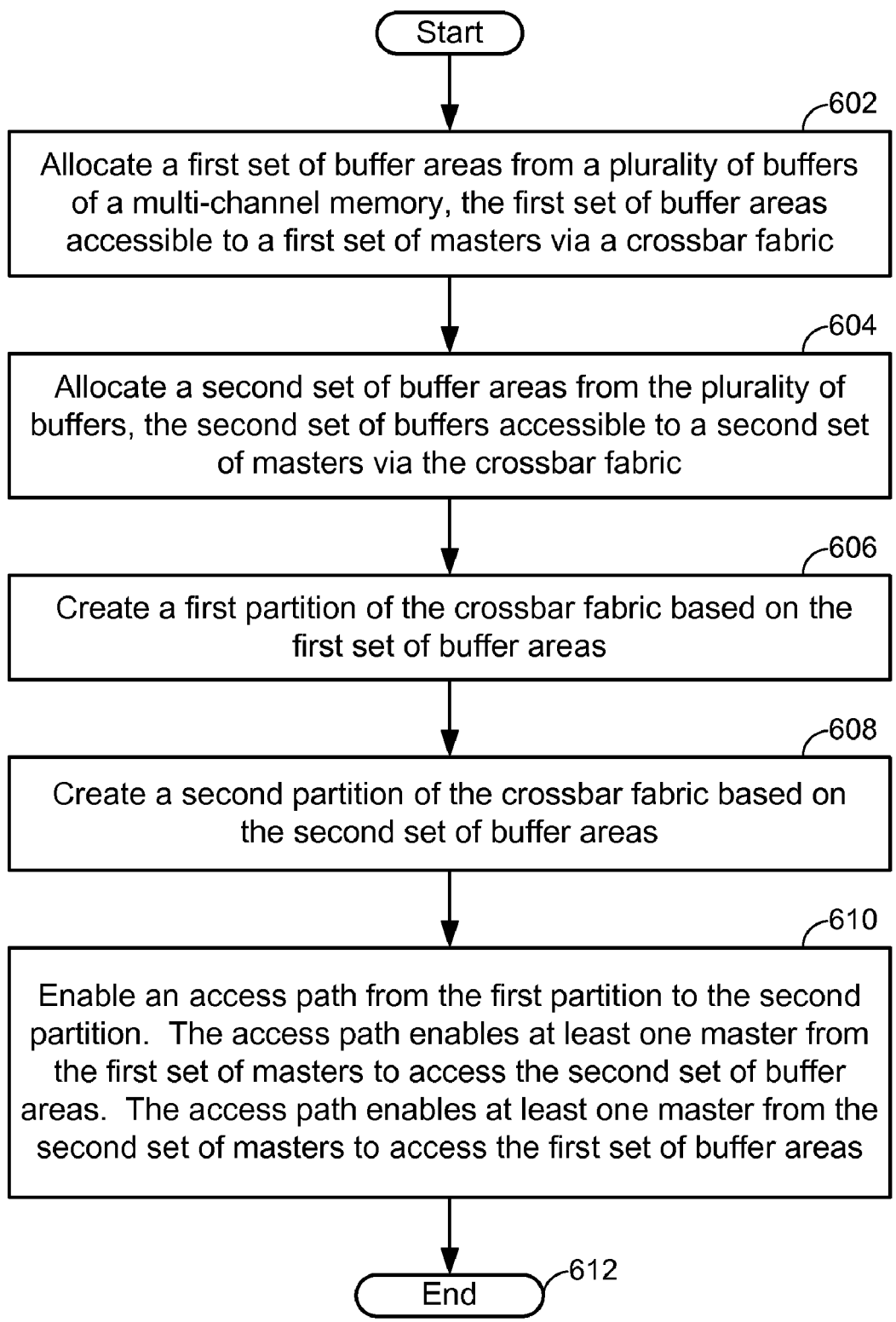
FIG. 6 is a flow diagram of a second illustrative embodiment of a method of partitioning an interconnect in a multi-channel memory system.

FIG. 6 is flow diagram of a second illustrative embodiment of a method of partitioning of an interconnect in a multi-channel memory system. The method may be performed by a computer such as the computer 292 in FIG. 2.

A first set of buffer areas are allocated from a plurality of buffer areas of a multi-channel memory at 602. The first set of buffer areas is accessible to a first set of masters by a crossbar fabric. Moving to 604, a second set of buffer areas are allocated from the plurality of buffers. The second set of buffers may be accessible to a second set of masters by the crossbar fabric. Advancing to 606, a first partition of the crossbar fabric is created based on the first set of buffer areas. Proceeding to 608, a second partition of the crossbar fabric is created based on the second set of buffer areas. Continuing to 610, an access path from the first partition to the second partition may be enabled. The access path may enable at least one master from the first set of masters to access the second set of buffer areas. The access path may enable at least one master from the second set of masters to access the first set of buffer areas. The method ends at 612.

Thus, by partitioning a crossbar interconnect into two or more partitions, a number of interconnecting routes of the crossbar interconnect may be reduced, thereby reducing power consumption and heat generated by the crossbar interconnect. Adding an access path between two or more partitions enables access between sets of masters and sets of buffer areas select without significantly increasing the number of interconnecting routes of the crossbar interconnect.

Figure 7:
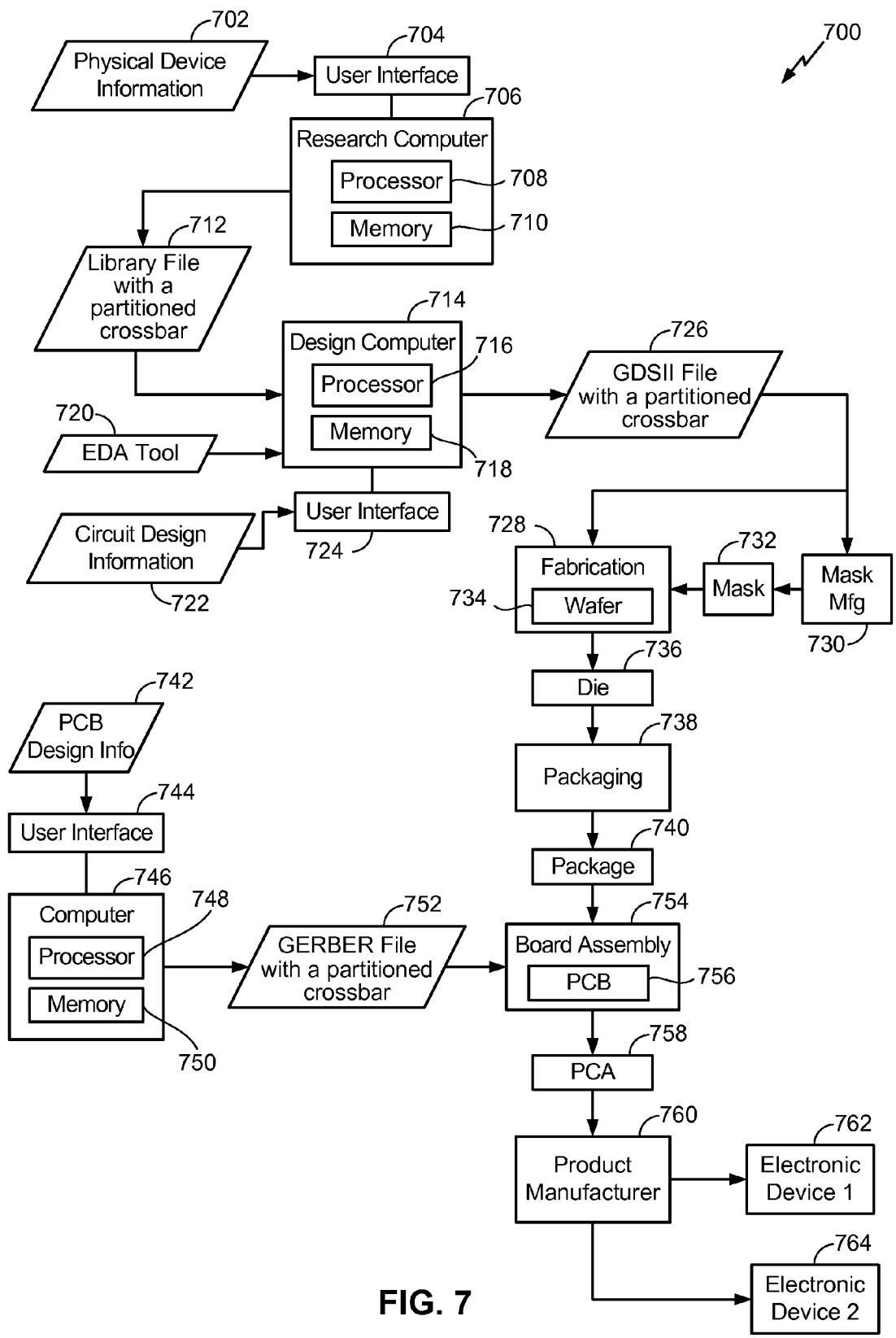
FIG. 7 is an illustrative embodiment of a method of manufacturing an integrated circuit device.

FIG. 7 is a data flow diagram of a particular illustrative embodiment of a manufacturing process to manufacture electronic devices that include a partitioned crossbar interconnect in a multi-channel memory system.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above. FIG. 7 depicts a particular illustrative embodiment of an electronic device manufacturing process 700.

Physical device information 702 is received in the manufacturing process 700, such as at a research computer 706. The physical device information 702 may include design information representing at least one physical property of a semiconductor device, such as the system 100 of FIG. 1, the integrated circuit 201 of FIG. 2, the system 300 of FIG. 3, the system 400 of FIG. 4, or any combination thereof. For example, the physical device information 702 may include physical parameters, material characteristics, and structure information that is entered via a user interface 704 coupled to the research computer 706. The research computer 706 includes a processor 708, such as one or more processing cores, coupled to a computer readable medium such as a memory 710. The memory 710 may store computer readable instructions that are executable to cause the processor 708 to transform the physical device information 702 to comply with a file format and to generate a library file 712.

In a particular embodiment, the library file 712 includes at least one data file including the transformed design information. For example, the library file 712 may include a library of semiconductor devices including the system 100 of FIG. 1, the integrated circuit 201 of FIG. 2, the system 300 of FIG. 3, the system 400 of FIG. 4, or any combination thereof, that is provided for use with an electronic design automation (EDA) tool 720.

The library file 712 may be used in conjunction with the EDA tool 720 at a design computer 714 including a processor 717, such as one or more processing cores, coupled to a memory 718. The EDA tool 720 may be stored as processor executable instructions at the memory 718 to enable a user of the design computer 714 to design a circuit using the system 100 of FIG. 1, the integrated circuit 201 of FIG. 2, the system 300 of FIG. 3, or any combination thereof, of the library file 712. For example, a user of the design computer 714 may enter circuit design information 722 via a user interface 724 coupled to the design computer 714. The circuit design information 722 may include design information representing at least one physical property of a semiconductor device, such as the system 100 of FIG. 1, the integrated circuit 201 of FIG. 2, the system 300 of FIG. 3, or any combination thereof. To illustrate, the circuit design property may include identification of particular circuits and relationships to other elements in a circuit design, positioning information, feature size information, interconnection information, or other information representing a physical property of a semiconductor device.

The design computer 714 may be configured to transform the design information, including the circuit design information 722, to comply with a file format. To illustrate, the file formation may include a database binary file format representing planar geometric shapes, text labels, and other information about a circuit layout in a hierarchical format, such as a Graphic Data System (GDSII) file format. The design computer 714 may be configured to generate a data file including the transformed design information, such as a GDSII file 727 that includes information describing the system 100 of FIG. 1, the integrated circuit 201 of FIG. 2, the system 300 of FIG. 3, or any combination thereof, in addition to other circuits or information. To illustrate, the data file may include information corresponding to a system-on-chip (SOC) that includes at least one of the system 100 of FIG. 1, the integrated circuit 201 of FIG. 2, the system 300 of FIG. 3, and that also includes additional electronic circuits and components within the SOC.

The GDSII file 726 may be received at a fabrication process 728 to manufacture the system 100 of FIG. 1, the integrated circuit 201 of FIG. 2, the system 300 of FIG. 3, or any combination thereof, according to transformed information in the GDSII file 726. For example, a device manufacture process may include providing the GDSII file 726 to a mask manufacturer 730 to create one or more masks, such as masks to be used for photolithography processing, illustrated as a representative mask 732. The mask 732 may be used during the fabrication process to generate one or more wafers 734, which may be tested and separated into dies, such as a representative die 736. The die 736 includes a circuit including the system 100 of FIG. 1, the integrated circuit 201 of FIG. 2, the system 300 of FIG. 3, or any combination thereof.

The die 736 may be provided to a packaging process 738 where the die 736 is incorporated into a representative package 740. For example, the package 740 may include the single die 736 or multiple dies, such as a system-in-package (SiP) arrangement. The package 740 may be configured to conform to one or more standards or specifications, such as Joint Electron Device Engineering Council (JEDEC) standards.

Information regarding the package 740 may be distributed to various product designers, such as via a component library stored at a computer 746. The computer 746 may include a processor 748, such as one or more processing cores, coupled to a memory 710. A printed circuit board (PCB) tool may be stored as processor executable instructions at the memory 750 to process PCB design information 742 received from a user of the computer 746 via a user interface 744. The PCB design information 742 may include physical positioning information of a packaged semiconductor device on a circuit board, the packaged semiconductor device corresponding to the package 740 including the system 100 of FIG. 1, the integrated circuit 201 of FIG. 2, the system 300 of FIG. 3, or any combination thereof.

The computer 746 may be configured to transform the PCB design information 742 to generate a data file, such as a GERBER file 752 with data that includes physical positioning information of a packaged semiconductor device on a circuit board, as well as layout of electrical connections such as traces and vias, where the packaged semiconductor device corresponds to the package 740 including the system 100 of FIG. 1, the integrated circuit 201 of FIG. 2, the system 300 of FIG. 3, or any combination thereof. In other embodiments, the data file generated by the transformed PCB design information may have a format other than a GERBER format.

The GERBER file 752 may be received at a board assembly process 754 and used to create PCBs, such as a representative PCB 756, manufactured in accordance with the design information stored within the GERBER file 752. For example, GERBER file 752 may be uploaded to one or more machines for performing various steps of a PCB production process.

The PCB 756 may be populated with electronic components including the package 740 to form a represented printed circuit assembly (PCA) 758.

The PCA 758 may be received at a product manufacture process 760 and integrated into one or more electronic devices, such as a first representative electronic device 762 and a second representative electronic device 764. As an illustrative, non-limiting example, the first representative electronic device 762, the second representative electronic device 764, or both, may be selected from the group of a set top box, a music player, a video player, an entertainment unit, a navigation device, a communications device, a personal digital assistant (PDA), a fixed location data unit, and a computer. As another illustrative, non-limiting example, one or more of the electronic devices 762 and 764 may be remote units such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although one or more of FIGS. 1-3 may illustrate remote units according to the teachings of the disclosure, the disclosure is not limited to these exemplary illustrated units. Embodiments of the disclosure may be suitably employed in any device which includes active integrated circuitry including memory and on-chip circuitry for test and characterization.

Thus, the system 100 of FIG. 1, the integrated circuit 201 of FIG. 2, the system 300 of FIG. 3, or any combination thereof, may be fabricated, processed, and incorporated into an electronic device, as described in the illustrative process 700. One or more aspects of the embodiments disclosed with respect to FIGS. 1-3 may be included at various processing stages, such as within the library file 712, the GDSII file 726, and the GERBER file 752, as well as stored at the memory 710 of the research computer 706, the memory 718 of the design computer 714, the memory 750 of the computer 746, the memory of one or more other computers or processors (not shown) used at the various stages, such as at the board assembly process 754, and also incorporated into one or more other physical embodiments such as the mask 732, the die 736, the package 740, the PCA 758, other products such as prototype circuits or devices (not shown), or any combination thereof. Although various representative stages of production from a physical device design to a final product are depicted, in other embodiments fewer stages may be used or additional stages may be included. Similarly, the process 700 may be performed by a single entity, or by one or more entities performing various stages of the process 700.

Figure 8:
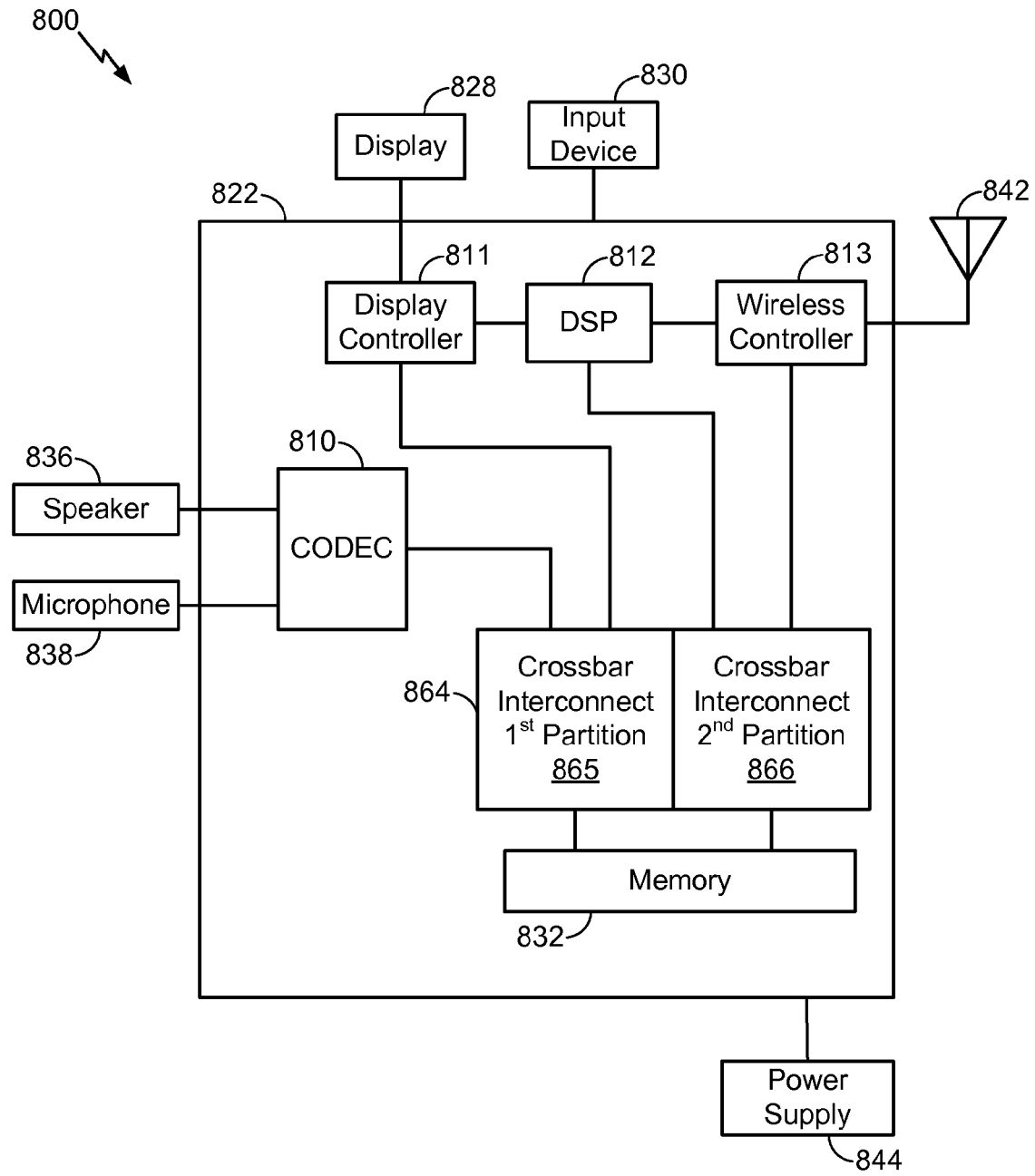
FIG. 8 is an illustrative embodiment of an electronic device.

Referring to FIG. 8, a block diagram of a particular illustrative embodiment of an electronic device including at least one of the system 100 of FIG. 1, the integrated circuit 201 of FIG. 2, the system 300 of FIG. 3, and the system 400 of FIG. 4 is depicted and generally designated 800. For example, the system 800 may be an electronic device such as a Personal Digital Assistant (PDA), a wireless mobile device, a computing device, other type of device, or any combination thereof. The device 800 includes four processors: a Coder-Decoder (CODEC) 810, a display controller 811, a digital signal processor (DSP) 812, and a wireless controller 813. The processors 810-813 are coupled to a memory 832 via a crossbar interconnect 864. The crossbar interconnect is partitioned into a first partition 865 and a second partition 866. In an illustrative example, the system 800 includes the multi-channel memory 109 of FIG. 1 and FIG. 2 and the multi-channel memory 308 of FIG. 3, has circuit parameters determined using one or more of the systems of FIGS. 1-3, and incorporates one or more of the methods of FIGS. 4-5, or any combination thereof.

The display controller 811 is coupled to the DSP 812 and to a display 828. The CODEC 810 can also be coupled to the DSP 812. A speaker 836 and a microphone 838 can be coupled to the CODEC 810.

The wireless controller 813 can be coupled to the DSP 812 and to a wireless antenna 842. In a particular embodiment, the DSP 812, the display controller 811, the memory 832, the CODEC 810, the wireless controller 813, and the partitioned crossbar interconnect 864 are included in a system-in-package or system-on-chip device 822. In a particular embodiment, an input device 830 and a power supply 844 are coupled to the system-on-chip device 822. Moreover, in a particular embodiment, as illustrated in FIG. 8, the display 828, the input device 830, the speaker 836, the microphone 838, the wireless antenna 842, and the power supply 844 are external to the system-on-chip device 822. However, each of the display 828, the input device 830, the speaker 836, the microphone 838, the wireless antenna 842, and the power supply 844 can be coupled to a component of the system-on-chip device 822, such as an interface or a controller.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method, comprising:
identifying a first set of masters and a second set of masters from a plurality of masters included in a crossbar interconnect;
partitioning the crossbar interconnect into a plurality of partitions comprising at least a, bidirectional first partition corresponding to the first set of masters and a bidirectional second partition corresponding to the second set of masters;
allocating a first set of buffer areas within a multi-channel memory, the first set of buffer areas corresponding to the first set of masters, wherein the first set of masters has access to the first set of buffer areas within the multi-channel memory via the bidirectional first partition; and
allocating a second set of buffer areas within the multi-channel memory, the second set of buffer areas corresponding to the second set of masters, wherein the second set of masters has access to the second set of buffer areas within the multi-channel memory via the bidirectional second partition,
wherein the first set of buffer areas is not accessible to the second set of masters via the crossbar interconnect, and
wherein the second set of buffer areas is not accessible to the first set of masters via the crossbar interconnect.

2. The method of claim 1, further comprising identifying the first set of buffer areas corresponding to the first set of masters before partitioning the crossbar interconnect.

3. The method of claim 1, further comprising identifying the second set of buffer areas corresponding to the second set of masters before partitioning the crossbar interconnect.

4. The method of claim 1, further comprising partitioning the crossbar interconnect before the crossbar interconnect is manufactured.

5. The method of claim 1, further comprising allocating the first and second set of buffer areas after the crossbar interconnect is manufactured.

6. The method of claim 1, further comprising adding an access path from the bidirectional first partition of the crossbar interconnect to the bidirectional second partition of the crossbar interconnect, wherein the access path enables a master from the first set of masters to access a buffer area of the second set of buffer areas, and wherein the first set of buffer areas is not accessible to the second set of masters via the access path.

7. The method of claim 1, further comprising adding an access path from the bidirectional first partition of the crossbar interconnect to the bidirectional second partition of the crossbar interconnect, wherein the access path enables a master from the second set of masters to access a buffer area of the first set of buffer areas, and wherein the second set of buffer areas is not accessible to the first set of masters via the access path.

8. The method of claim 1, wherein the crossbar interconnect comprises a plurality of fabrics, each fabric enabling access to a subset of the multi-channel memory.

9. The method of claim 1, wherein identifying the first set of masters and the second set of masters from the plurality of masters, partitioning the crossbar interconnect into a plurality of partitions, allocating the first set of buffer areas within the multi-channel memory, and allocating the second set of buffer areas within the multi-channel memory are performed at a processor integrated into an electronic device.

10. The method of claim wherein data requested from the multi-channel memory via the first partition is sent from the multi-channel memory via the first partition.

11. The method of claim 1, wherein after partitioning the crossbar interconnect, the first set of masters is interconnected with the first set of buffer areas and is not interconnected with the second set of buffer areas and the second set of masters is interconnected with the second set of buffer areas and is not interconnected with the first set of buffer areas.

12. A computer-readable tangible medium storing instructions executable by a computer, the instructions comprising:
instructions that are executable by the computer to allocate a first set of masters of a plurality of masters included in a crossbar interconnect and to allocate a second set of masters of the plurality of masters included in the crossbar interconnect;
instructions that are executable by the computer to allocate a first set of buffer areas in a multi-channel memory, the first set of buffer areas accessible to the first set of masters;
instructions that are executable by the computer to allocate a second set of buffer areas in the multi-channel memory, the second set of buffer areas accessible to the second set of masters;
instructions that are executable by the computer to create a bidirectional first partition of the crossbar interconnect based on the first set of buffer areas, wherein the bidirectional first partition includes the first set of masters; and
instructions that are executable by the computer to create a bidirectional second partition of the crossbar interconnect based on the second set of buffer areas, wherein the bidirectional second partition includes the second set of masters,
wherein the first set buffer areas is not accessible the second set of masters via the crossbar interconnect, and
wherein the second set of buffer areas is not accessible to the first set of masters via the crossbar interconnect.

13. The computer-readable tangible medium of claim 12, further comprising instructions that are executable by the computer to enable an access path from the first partition to the second partition, the access path enabling at least one master from the second set of masters to access the first set of buffer areas.

14. The computer-readable tangible medium of claim 12, further comprising instructions that are executable by the computer to create a third partition of the crossbar interconnect based on a third set of buffer areas.

15. The computer-readable tangible medium of claim 12, wherein the first set of buffer areas are allocated based on a first number of slaves associated with the first set of masters and the second set of buffer areas are allocated based on a second number of slaves associated with the second set of masters.

16. The computer-readable tangible medium of claim 12, wherein the first and second set of buffer areas are allocated based on a number of channels of the multi-channel memory.

17. The computer-readable tangible medium of claim 16, wherein the crossbar interconnect includes a number of crossbar fabrics corresponding to the number of channels of the multi-channel memory wherein each of the crossbar fabrics enables access to a subset of the multi-channel memory.

18. The computer-readable tangible medium of claim 12, wherein the first and second set of buffer areas are allocated based on a buffer size of each of the buffer areas.

19. The computer-readable tangible medium of claim 12, wherein the first and second set of buffer areas are allocated based on an access speed of the multi-channel memory.

20. The computer-readable tangible medium of claim 12, wherein the first set of buffer areas are allocated based on a first distance between the first set of masters and a first set of slaves and the second set of buffer areas are allocated based on a second distance between the second set of masters and a second set of slaves.

21. The computer-readable tangible medium of claim 12, wherein the instructions are executable by a processor integrated in a device selected from the group consisting of a set top box, a music player, a video player, an entertainment unit, a navigation device, a communications device, a personal digital assistant, a fixed location data unit, and a computer.

22. The computer-readable tangible medium of claim 12, wherein data requested from the multi-channel memory via the first partition is sent from the multi-channel memory via the first partition.

23. The computer-readable tangible medium of claim 12, wherein after partitioning the crossbar fabric, the first set of masters is interconnected with the first set of buffer areas and is not interconnected with the second set of buffer areas and the second set of masters is interconnected with the second set of buffer areas and is not interconnected with the first set of buffer areas.

24. An electronic device, comprising:
a multi-channel memory having a first set of buffer areas and a second set of buffer areas; and
a crossbar interconnect that includes a plurality of masters comprising a first set of masters and a second set of masters,
wherein the first set of buffer areas are allocated to the first set of masters and the second set of buffer areas are allocated to the second set of masters,
wherein the crossbar interconnect is partitioned into a plurality of bidirectional partitions based on the allocation of the first set of buffer areas to the first set of masters and the allocation of the second set of buffer areas to the second set of masters,
wherein the first set of masters access the multi-channel memory via the first set of buffer areas and the second set of masters access the multi-channel memory via the second set of buffer areas,
wherein the first set of buffer areas is not accessible to the second set of masters via the crossbar interconnect, and
wherein the second set of buffer areas is not accessible to the first set of masters via the crossbar interconnect.

25. The electronic device of claim 24, wherein the electronic device comprises a mobile computing device.

26. The electronic device of claim 24, further comprising a plurality of slaves to receive requests from the plurality of masters to access the multi-channel memory, wherein a first set of slaves is associated with the first of masters, and wherein a second set of slaves is associated the second set of masters.

27. The electronic device of claim 26, wherein a slave of the first set of slaves receives a request to access the multi-channel memory from a master of the first set of masters and accesses a partition of the crossbar interconnect associated with the master.

28. The electronic device of claim 27, wherein the master comprises a digital signal processor (DSP).

29. The electronic device of claim 27, wherein the slave sends a response to the master after accessing the partition of the crossbar interconnect associated with the master.

30. The electronic device of claim 24, wherein the electronic device is integrated into at least one semiconductor die.

31. The electronic device of claim 24, further comprising a device selected from the group consisting of a set top box, a music player, a video player, an entertainment unit, a navigation device, a communications device, a personal digital assistant, a fixed location data unit, and a computer, into which the electronic device is integrated.

32. The electronic device of claim 24, wherein data requested from the multi-channel memory via the first partition is sent from the multi-channel memory via the first partition.

33. The electronic device of claim 24, wherein the first set of masters is interconnected with the first set of buffer areas and is not interconnected with the second set of buffer areas and the second set of masters is interconnected with the second set of buffer areas and is not interconnected with the first set of buffer areas.

34. An electronic device, comprising:
means for storing data, the means for storing data comprising a first set of buffer areas and a second set of buffer areas; and
means for enabling access to the means for storing data, the means for enabling access to the means for storing data comprising means for controlling a bus,
wherein the means for controlling the bus comprises a first set of bus masters and a second set of bus masters,
wherein the means for enabling access to the means for storing data is partitioned into a plurality of bidirectional partitions based on an allocation of the first set of buffer areas to the first set of bus masters and an allocation of the second set of buffer areas to the second set of bus masters,
wherein the first set of buffer areas is not accessible to the second set of masters via the crossbar interconnect; and
wherein the second set of buffer areas is not accessible to the first set of masters via the crossbar interconnect.

35. The electronic device of claim 34, wherein the means for storing data and the means for enabling access are integrated into at least one semiconductor die.

36. The electronic device of claim 34, further comprising a device selected from the group consisting of a set top box, a music player, a video player, an entertainment unit, a navigation device, a communications device, a personal digital assistant, a fixed location data unit, and a computer, into which the electronic device is integrated.

37. The electronic device of claim 34, wherein the first set of bus masters is interconnected with the first set of buffer areas and is not interconnected with the second set of buffer areas and the second set of bus masters is interconnected with the second set of buffer areas and is not interconnected with the first set of buffer areas.

38. A method, comprising:
a first step for identifying a first set of masters and a second set of masters from a plurality of masters included in a crossbar interconnect;
a second step for partitioning the crossbar interconnect into a plurality of partitions comprising at least a bidirectional first partition corresponding to the first set of masters and a bidirectional second partition corresponding to the second set of masters;
a third step for allocating a first set of buffer areas in a multi-channel memory, the first set of buffer areas corresponding to the first set of masters, wherein the first set of masters access the multi-channel memory via the first set of buffer areas; and a fourth step for allocating a second set of buffer areas in the multi-channel memory, the second set of buffer areas corresponding to the second set of masters, wherein the second set of masters access the multi-channel memory via the second set of buffer areas, wherein the first set of buffer areas is not accessible to the second set of masters via the crossbar interconnect, and wherein the second set of buffer areas is not accessible to the first set of masters via the crossbar interconnect.

39. The method of claim 38, wherein the first step, the second step, the third step, and the fourth step are performed by a processor integrated into an electronic device.

40. The method of claim 38, wherein after partitioning the crossbar interconnect, the first set of masters is interconnected with the first set of buffer areas and is not interconnected with the second set of buffer areas and the second set of masters is interconnected with the second set of buffer areas and is not interconnected with the first set of buffer areas.

41. A method comprising:

receiving a data file comprising design information corresponding to a semiconductor device; and fabricating the semiconductor device according to the design information, wherein the semiconductor device comprises:

a multi-channel memory having a first set of buffer areas and a second set of butter areas; and a crossbar interconnect that includes a plurality of masters comprising a first set of masters and a second set of masters, wherein the first set of buffer areas are allocated to the first set of masters and the second set of buffer areas are allocated to the second set of masters, wherein the crossbar interconnect is partitioned into a plurality of bidirectional partitions based on the allocation of the first set of buffer areas to the first set of masters and based on the allocation of the second set of buffer areas to the second set of masters, wherein the first set of masters access the multi-channel memory via the first set of buffer areas and the second set of masters access the multi-channel memory via the second set of buffer areas, wherein the first set of buffer areas is not accessible to the second set of masters via the crossbar interconnect, and wherein the second set of buffer areas is not accessible to the first set of masters via the crossbar interconnect.

42. The method of claim 41, wherein the data file includes a GDSII format.

43. The method of claim 41, wherein the data file includes a GERBER format.

44. The method of claim 41, wherein the first set of masters is interconnected with the first set of buffer areas and is not interconnected with the second set of buffer areas and the second set of masters is interconnected with the second set of buffer areas and is not interconnected with the first set of buffer areas.

* * * * *